US008458461B2

(12) United States Patent
Tardo

(10) Patent No.: US 8,458,461 B2
(45) Date of Patent: *Jun. 4, 2013

(54) METHODS AND APPARATUS FOR PERFORMING AUTHENTICATION AND DECRYPTION

(75) Inventor: Joseph Tardo, Palo Alto, CA (US)

(73) Assignee: Broadcom Corporation, Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/843,386

(22) Filed: Jul. 26, 2010

(65) Prior Publication Data

US 2010/0293377 A1    Nov. 18, 2010

Related U.S. Application Data

(63) Continuation of application No. 11/491,166, filed on Jul. 24, 2006, now Pat. No. 7,764,788, which is a continuation of application No. 10/160,335, filed on May 31, 2002, now Pat. No. 7,082,534.

(51) Int. Cl.
*H04L 12/22* (2006.01)
*H04L 9/34* (2006.01)

(52) U.S. Cl.
USPC ............................................ 713/161; 726/30

(58) Field of Classification Search
None
See application file for complete search history.

(56) References Cited

U.S. PATENT DOCUMENTS

| 5,293,576 | A | 3/1994 | Mihm et al. |
|---|---|---|---|
| 5,649,014 | A | 7/1997 | Koopman et al. |
| 6,128,737 | A | 10/2000 | Jakubowski et al. |
| 6,275,588 | B1 * | 8/2001 | Videcrantz et al. ........... 380/255 |
| 6,477,646 | B1 | 11/2002 | Krishna et al. |
| 7,082,534 | B2 | 7/2006 | Tardo |
| 7,764,788 | B2 | 7/2010 | Tardo |
| 2001/0021253 | A1 | 9/2001 | Furuya et al. |
| 2002/0071552 | A1 | 6/2002 | Rogaway |
| 2002/0083317 | A1 | 6/2002 | Ohta et al. |
| 2002/0114452 | A1 | 8/2002 | Hamilton |
| 2002/0191450 | A1 | 12/2002 | North et al. |
| 2002/0191785 | A1 | 12/2002 | McBrearty et al. |

OTHER PUBLICATIONS

Network Working Group HMAC:Keyed-Hashiung for Message Authentication. Krawcyzk et al. Feb. 1997.*
Barreto, P.S.L.M. et al., "Toward Secure Public-Key Blockwise Fragile Authentication Watermarking", *IEEE Prot.-Vis. Image Signal Process*, vol. 149, No. 2, Apr. 2002, pp. 57-62.
Schreier, B., "Applied Cryptography—Protocols, Algorithms and Source Code in C", *Basic Protocols*, Chapter 3, pp. 47-74.
Zuete, A. and Guedes, P., "Transparent Authentication and Confidentiality for Stream Sockets", IEEE Micro, 1996, pp. 34-41.
Notice of Allowance for U.S. Appl. No. 11/491,166 mailed Mar. 22, 2010, 6 pages.

(Continued)

*Primary Examiner* — Venkat Perungavoor
(74) *Attorney, Agent, or Firm* — Sterne, Kessler, Goldstein & Fox PLLC

(57) ABSTRACT

Methods and apparatus are provided for performing authentication and decryption operations. A record including multiple encrypted blocks is received. An encrypted block in the record is extracted and decrypted first in order to obtain context information for performing authentication operations. Each remaining block is then decrypted and authenticated by using the available context information. Authentication operations can be performed without having to wait for the decryption of all of the blocks in the record.

20 Claims, 8 Drawing Sheets

OTHER PUBLICATIONS

Non-Final Office Action for U.S. Appl. No. 11/491,166 mailed May 27, 2009, 7 pages.
Non-Final Office Action for U.S. Appl. No. 11/491,166 mailed Dec. 2, 2008, 6 pages.
Non-Final Office Action for U.S. Appl. No. 11/491,166 mailed Mar. 17, 2008, 4 pages.
Notice of Allowance for U.S. Appl. No. 10/160,335 mailed Mar. 7, 2006, 6 pages.
Non-Final Office Action for U.S. Appl. No. 10/160,335 mailed Dec. 1, 2005, 7 pages.

* cited by examiner

METHODS AND APPARATUS FOR PERFORMING AUTHENTICATION AND DECRYPTION

CROSS REFERENCE TO RELATED APPLICATIONS

This application is a continuation of U.S. application Ser. No. 11/491,166, filed Jul. 24, 2006, now allowed as U.S. Pat. No. 7,764,788, titled "Methods and Apparatus for Performing Authentication and Decryption," which is a continuation of U.S. application Ser. No. 10/160,335, filed May 31, 2002, now U.S. Pat. No. 7,082,534, issued on Jul. 25, 2006, each of which is incorporated by reference herein in its entirety.

BACKGROUND OF THE INVENTION

1. Field of the Invention

The present application relates to cryptography operations. More specifically, the present application relates to methods and apparatus for efficiently performing authentication operations on a block in a record as soon as the block is decrypted.

2. Background Art

Many secure communications protocols, for example Secure Sockets Layer (SSL) and Transport Layer Security (TLS), specify that data be both encrypted for data privacy and authenticated for integrity and source verification. Conventional software and hardware designs for performing decryption and authentication operations are inefficient. One technique for performing authentication and decryption entails using software techniques to receive a record and decrypt the entire record. Upon decrypting the entire record, authentication operations are then performed on each of the decrypted blocks in the record. However, many inefficiencies are introduced by having to read and process the same data multiple times. Many firmware and hardware techniques share similar inefficiencies.

Software, firmware and hardware techniques for performing decryption and authentication operations, such as DES, RC4, AES, MD5 and SHA1 operations used in secured sessions have been inefficient and resource intensive. Secured sessions, authentication operations, and decryption algorithms are described in Applied Cryptography, Bruce Schneier, John Wiley & Sons, Inc. (ISBN 0471128457), NIST Federal Information Processing Standard FIDS-197 (AES), Internet Engineering Task Force (IETF) Request for Comments Standard RFC2246 (TLS), and SSL and TLS: Designing and Building Secure Systems, by Eric Rescorla (ISBN 0201615983), the entireties of which are incorporated by reference for all purposes.

It is therefore desirable to provide methods and apparatus for improving decryption and authentication processing with respect to some or all of the performance limitations noted above.

BRIEF SUMMARY OF THE INVENTION

Methods and apparatus are provided for performing authentication and decryption operations. A record including multiple encrypted blocks is received. An encrypted block in the record is extracted and decrypted first in order to obtain context information for performing authentication operations. Each remaining block is then decrypted and authenticated by using the available context information. Authentication operations can be performed without having to wait for the decryption of all of the blocks in the record.

In one embodiment, a method for performing authentication and decryption is provided. A first block in a record comprising a plurality of encrypted blocks is decrypted. The first block includes context information for deriving authentication values. A second block in the record comprising the plurality of encrypted blocks is decrypted. An authentication value associated with the second block is derived by using context information before the remaining blocks in the record are decrypted.

In another embodiment, a cryptography accelerator is provided. The cryptography accelerator includes interface circuitry, cryptography circuitry, and authentication circuitry. The interface circuitry is operable to receive a record including a plurality of encrypted blocks. The cryptography circuitry is coupled to the interface circuitry. The cryptography circuitry is operable to receive the record from the interface circuitry and decrypt a first block in the record. The first block includes context information. The authentication circuitry is operable to derive an authentication value associated with a second block in the record by using context information obtained upon decrypting the first block. The authentication value is derived before a third block in the record is decrypted.

These and other features and advantages of the present invention will be presented in more detail in the following specification of the invention and the accompanying figures, which illustrate by way of example the principles of the invention.

BRIEF DESCRIPTION OF THE DRAWINGS/FIGURES

The invention may best be understood by reference to the following description taken in conjunction with the accompanying drawings, which are illustrative of specific embodiments of the present invention.

DETAILED DESCRIPTION OF THE INVENTION

The present application relates to implementing a cryptography accelerator. More specifically, the present application relates to methods and apparatus for providing a cryptography accelerator capable of performing simultaneous decryption and authentication.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of SSL or TLS using the DES, AES, and RC4 encryption algorithms and the SHA-1 and MD5 authentication algorithms. However, it should be noted that the techniques of the present invention can be applied to a variety of different authentication and cryptography operations for cryptography processing in general. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
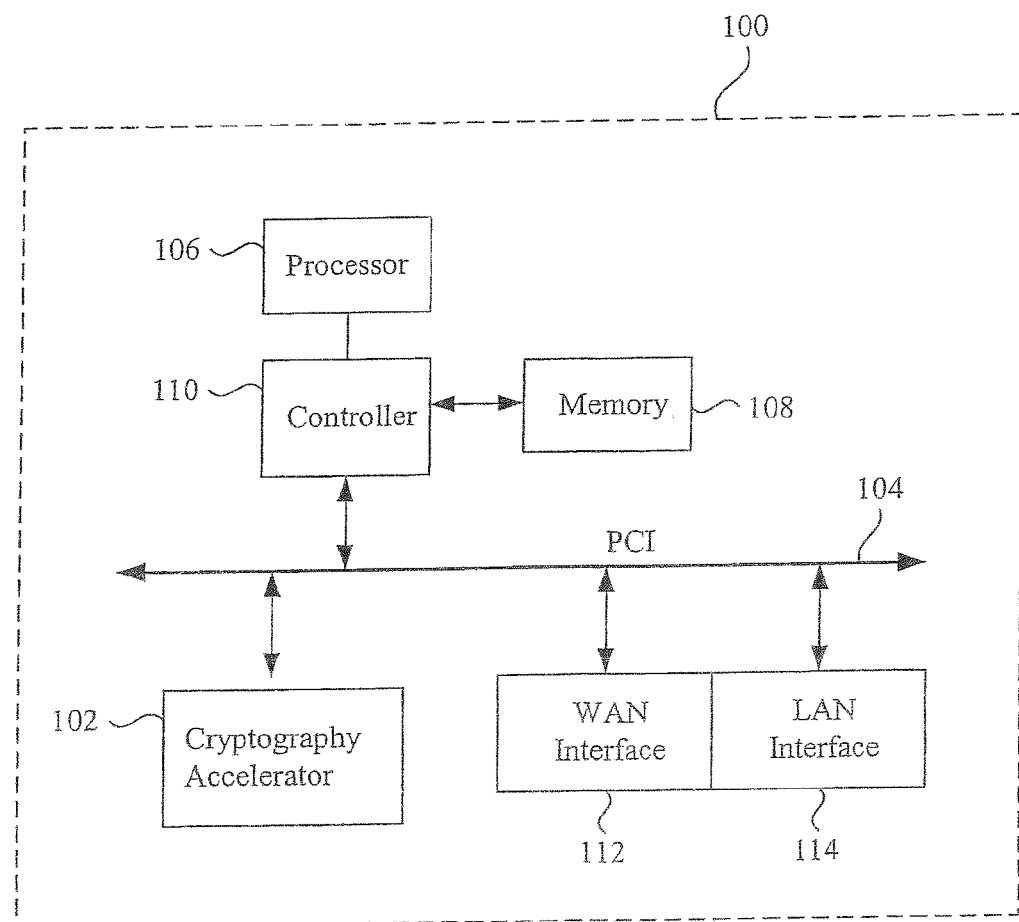
FIG. 1 is a diagrammatic representation of a system that can use the techniques of the present invention.

FIG. 1 is a diagrammatic representation of one example of a processing system 100 in accordance with an embodiment of the present invention. As shown in FIG. 1, the present invention may be implemented in a stand-alone cryptography accelerator 102 or as part of the system 100. Any logic, mechanism, or device operable to perform encryption, decryption, and/or authentication operations is referred to herein as a cryptography accelerator. In the described embodiment, the cryptography accelerator 102 is connected to a bus 104 such as a PCI bus via a standard on-chip PCI interface. The processing system 100 includes a processing unit 106 and a system memory unit 108. The processing unit 106 and the system memory unit 108 are coupled to the system bus 104 via a bridge and memory controller 110.

Although the processing unit 106 may be the central processing unit (CPU) of a system 100, it does not necessarily have to be the CPU. It can be one of a variety of processors in a multiprocessor system. In one example, a LAN interface 114 is provided to couple the processing system 100 to a local area network (LAN) to allow packet receipt and transmission. Similarly, a Wide Area Network (WAN) interface 112 can also be provided to connect the processing system to a WAN (not shown) such as the Internet. The WAN interface manages in-bound and out-bound packets to allow automatic decryption and authentication processing.

According to various embodiments, the cryptography accelerator 102 is an application specific integrated circuit (ASIC) coupled to the processor 106. The cryptography accelerator 102 can also be a programmable logic device (PLD), field programmable gate array (FPGA), or other device coupled to the processor 106. According to specific embodiments, the cryptography accelerator 102 is implemented either on a card connected to the bus 104 or as a standalone chip integrated in the system 100.

In other embodiments, the cryptography accelerator 102 itself is integrated into the processing core of a CPU of system 100, such as that available from Tensilica Corporation of Santa Clara, Calif. or MIPS Technologies of Mountain View, Calif. In another embodiment, techniques and mechanisms of the present invention are integrated into a CPU such as a CPU available from Intel Corporation of San Jose, Calif. or AMD Corporation of Sunnyvale, Calif. By implementing cryptography accelerator functionality entirely on the processor 106, a separate card or chip in the system 100 is not needed. In still other embodiments, the processing system 100 including the cryptography accelerator 102 is implemented as a system on a chip (SOC). The network interfaces, memory, processing core, and cryptography accelerator functionality are provided on a single integrated circuit device.

The cryptography accelerator 102 is capable of implementing various network security standards, such as SSL and TLS, which provide application-transparent encryption and authentication services for network traffic. It should be noted that all references to SSL also apply to TLS.

Network security standards such as SSL provide authentication through the use of hash algorithms and encryption through the use of encryption algorithms. Two commonly used hash algorithms are MD5 and the Secure Hash algorithm (SHA-1). Other hash algorithms such as MD4 and MD2 are also available. Two commonly used encryption algorithms are DES and RC4. Other encryption algorithms such as triple DES and AES, are also available. Authentication and encryption algorithms are described in Applied Cryptography, Bruce Schreier, John Wiley & Sons, Inc. (ISBN 0471128457), incorporated by reference in its entirety for all purposes. Even though many network security standards apply the same hash algorithms, different approaches are taken toward applying the hash algorithms to the actual authentication computation.

Protocols such as SSL specify performing authentication operations on data in a data sequence to derive an authentication code. The data and the authentication code are then encrypted for transmission as an encrypted data sequence. An entity receiving the encrypted data sequence typically processes the data by decrypting the sequence. After the entire sequence is decrypted, the original data sequence and the authentication code are obtained. Authentication operations are then performed on the data sequence to determine if the authentication code corresponds with the data sequence.

However, many techniques for performing SSL operations require that the data be processed multiple times. In one example, an encrypted data sequence is decrypted in a first pass. It should be noted that authentication operations can not be performed first or simultaneously here because the authentication operations require decrypted data and a decrypted authentication code. Authentication operations are performed in a subsequent pass after the data sequence is decrypted in order to derive authentication values that are checked against an authentication code. These techniques require that the data sequence be processed several times, leading to inefficient and redundant processing. Typical software and hardware implementations fail to efficiently decrypt and authenticate a data sequence in a single pass.

The techniques of the present invention, however, provide not only for a cryptography accelerator configured for efficient decryption and authentication processing, the techniques of the present invention provide for simultaneous authentication and decryption by selectively decrypting and authenticating portions of a data sequence at a time. By intelligently decrypting portions of a data sequence, in a specific order, efficient simultaneous decryption and authentication of portions of a data sequence is enabled.

Figure 2:
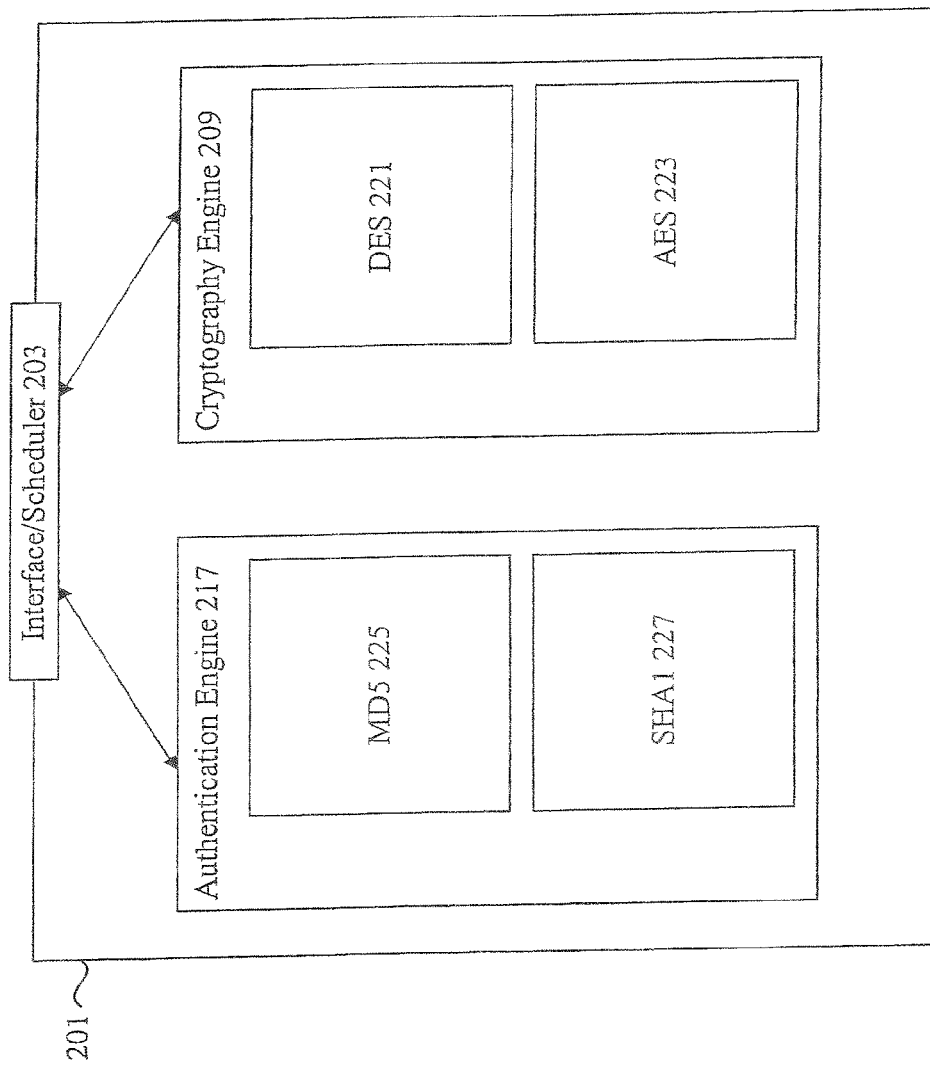
FIG. 2 is a diagrammatic representation of an integrated circuit containing processing cores for performing authentication and cryptography operations.

FIG. 2 is a diagrammatic representation of one example of a cryptography accelerator 201. The cryptography accelerator 201 includes an interface 203 connected to a host such as an external processor. According to various embodiments, the interface 203 receives information from the host for processing and sends information to the host when processing is completed. In one example, encrypted data associated with an SSL exchange is received through the interface. The interface 203 includes a scheduler for determining whether to send data blocks to various processing engines such as authentication engine 217 and cryptography engine 209. In one embodiment, encryption engine 209 includes components such as a DES engine 221 and an AES engine 223. An authentication engine 217 includes components such as MD5 engine 225 and SHA1 engine 227. It should be noted that a cryptography accelerator 201 can include other components as well, such as a public key engine or cores for performing other authentication and encryption algorithms.

According to various embodiments, components for performing operations such as XOR operations are also included in the cryptography accelerator. In one example, an XOR component is included in the authentication engine so that SHA-1 and MD5 processed data can be combined together.

According to various embodiments, the techniques of the present invention are used in a secured session. Any message exchange sequence between two parties using both authentication and encryption and common session information known to both parties is referred to herein as a secured session. In one example, a secured session is an SSL session. A secured session typically includes a handshake phase and a data exchange phase. A handshake phase often includes a key exchange sequence establishing common information, such as a shared key, for the transmission of data during the data exchange phase between two parties. Any mechanism involving exchanging information to establish a secured session between two entities is referred to herein as a handshake phase. According to various embodiments, the techniques of the present invention apply to the handshake phase.

Figure 3:
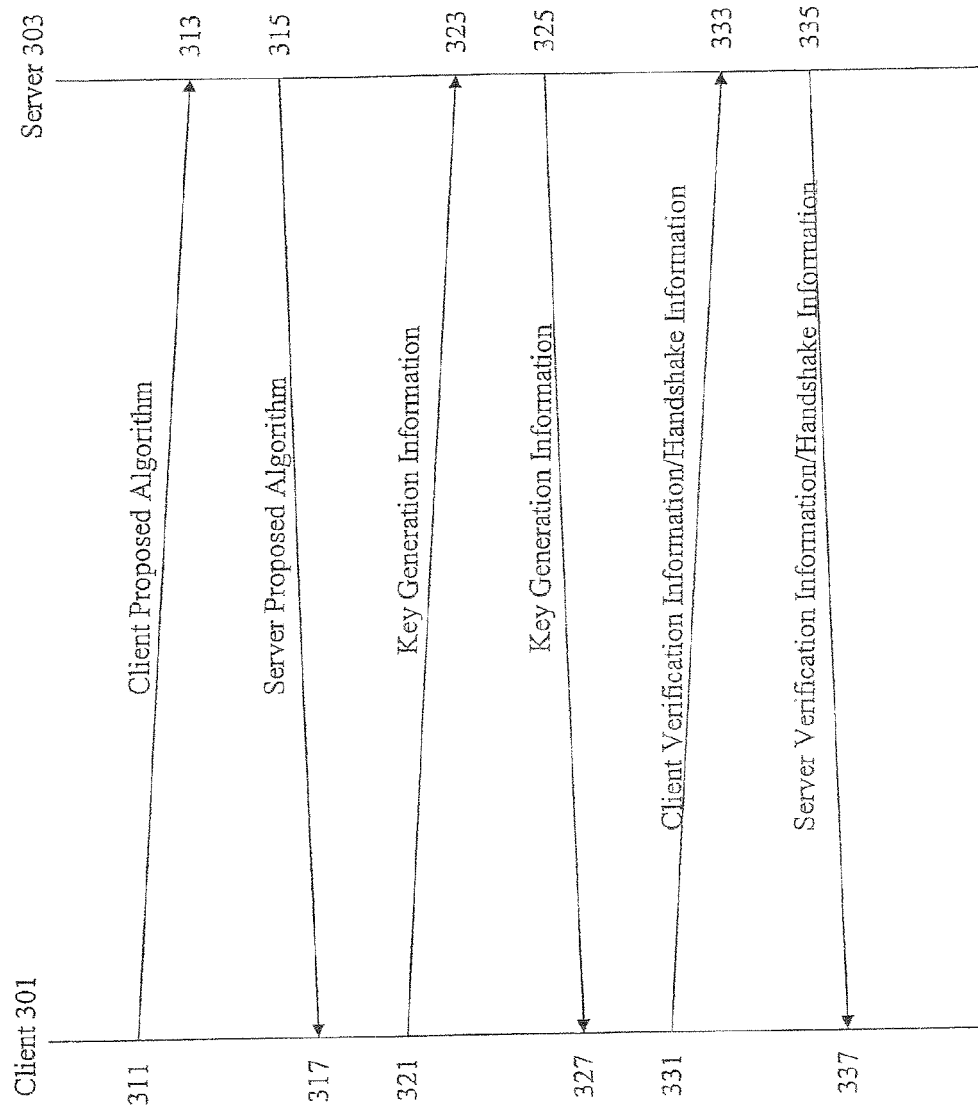
FIG. 3 is an interaction diagram showing a sequence in which the techniques of the present invention can be applied.

FIG. 3 is a transaction diagram showing one example of a handshake phase associated with SSL. A wide variety of sequences associated with handshake phases are available. At 311, the client 301 transmits a message with a security enable parameter to a server 303. In one embodiment, the authentication message contains an identifier such as a user name or an authentication identifier that allows the receiver to select an authentication mechanism out of a possible set of mechanisms. In another embodiment, the client sends an SSL version number, cipher settings, and client random information to the server 303. Server 303 mayor may not already have information associated with the client. The server 303 identifies the security enable parameter along with any client proposed algorithms and proposes algorithms for encryption, for authentication, and for exchange or agreement of the cryptographic keys.

According to various embodiments, the server sends the server's own SSL version number, cipher settings, and server random information to the client 301. In one embodiment, the server also sends its certificate. A certificate may be a hash of a combined public key and identifier associated with the server encrypted with a trusted third party key. If the client is requesting a server resource that requires client authentication, the server at this point can also request to client certificate. According to other embodiments, protocol version, session ID, cipher suite, and compression method are exchanged along with client random information and server random information.

At 317, client 301 uses the information sent by the server to authenticate the server. The client then generates a pre-master secret for the session, encrypts the pre-master secret with the server's public key obtained from the server certificate, and sends the encrypted pre-master secret to the server at 321. In one embodiment, the client computes a pre-master secret using server random information. Information such as a pre-master secret or a client random sequence used to derive session keys is referred to herein as key generation information. In one example, a pre-master secret is used by both the server and the client to derive a master secret which is then used subsequently to derive session keys. Any intermediate information used to derive session keys from key generation information is referred to herein as master secret information.

According to various embodiments, master secret information is not transmitted over the network during a handshake phase but is instead derived independently by both a client entity and a server entity. If the server requested client authentication, the client signs a piece of data that is unique to this handshake and known by both the client and server and sends both the signed information and the client's own certificate to the server. According to various embodiments, the client signs a piece of data unique to the handshake by performing a hash.

According to various embodiments, the server 303 at 325 attempts to authenticate the client if client authentication was requested. If the client can not be authenticated, the session is terminated. If the client can be authenticated, the server 303 uses the key generation information from the client to generate session keys. In one example, the server 303 uses its private key to decrypt the pre-master secret. Both the server 303 and the client 301 use key generation information such as the pre-master secret to generate a master secret and subsequently to generate the session keys.

In one embodiment, the cryptography accelerator generates a client encryption key, a server encryption key, a client authentication key, and a server authentication key. At 327, the session keys generated at both the client and the server are used to establish the secure session. According to various embodiments, cryptography accelerators associated with both client 301 and server 303 derive keys based on the selected algorithm. According to various embodiments, the session keys can be used for communications between client 301 and server 303. It should be noted that a variety of different authentication sequences and communication sequences in general can use the techniques of the present invention. For example, only a single session key may be generated in some instances.

At 331, client 301 sends handshake information to the server 303. Any information transmitted for determining that the session keys generated at the server and the session keys generated at the client are the same set of keys is referred to herein as handshake information or verification information. In one example, a server 303 receives from the client 301 handshake information including a hash of the session keys combined with other key generation information. The server 303 then calculates client verification information using the session keys it generated. If the handshake information corresponds with the client verification information generated at the server, verification is completed. Information generated by the server for comparison with handshake information sent from the client to determine that the client has the correct set of session keys is referred to herein as handshake information, client verification information, or client finished information.

At 333, the server typically decrypts any message associated with client verification information received from the client entity 301 and compares the decrypted message with the generated client verification information to determine that the client verification information matches. The server then typically issues a function call to a cryptography accelerator to generate a server verification message.

Information generated by a server and sent to a client to determine that the server has the correct set of session keys is referred to herein as handshake information, server verification information or server finished information. It should be noted that in the above implementation, a master secret is never transmitted over the network. Instead, both network entities use derivatives of the pre-master secret to generate the session keys and other cryptographic information used for secure transmission. Both the master secret and the session keys need not ever be transmitted over the network.

It is contemplated that a cryptography accelerator can be used in any network entity including client and server entities.

It should be noted that the handshake sequence shown in FIG. 3 is only one example of a sequence that can use the mechanisms and techniques of the present invention. In one example, both server and client can access key generation information from a third party source in order to derive information for a data exchange. In another example, client random numbers may be included in a client proposed algorithm message instead of a key generation information message.

Figure 4:
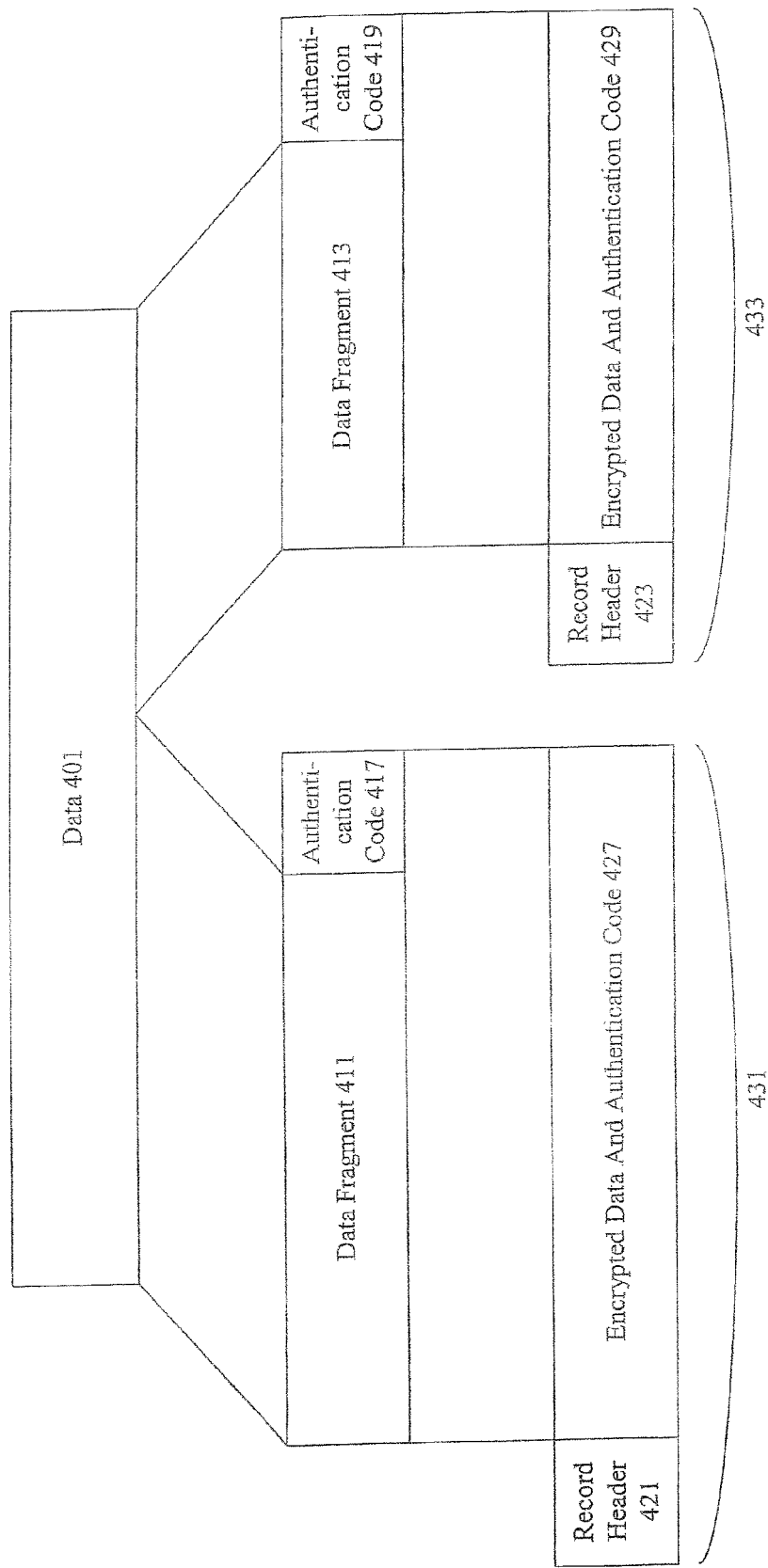
FIG. 4 is a diagrammatic representation showing data and records.

As noted above, a secured session typically includes a handshake phase and a data transfer phase. During a handshake phase, network entities are authenticated and cryptographic keys are exchanged. Data transfer typically occurs after the handshake phase is completed. Data transmitted in a secured session is generally broken up into fragments. FIG. 4 is a diagrammatic representation showing one example of the structure of fragmentation and protection. It should be noted that the fragmentation for a secured session is typically separate from the fragmentation of data for transmission as packets. That is, one or more fragments may or may not correspond to one or more packets.

According to various embodiments, a data sequence 401 is broken up into a series of fragments. Each fragment is protected individually. A receiver of the fragment is able to verify and authenticate each fragment. According to various embodiments, data sequence 401 is split into data fragment 411 and data fragment 413. Authentication operations are then performed on data fragment 411 and data fragment 413. In one example, hash operations corresponding to MD5 or SHA1 operations are performed on data fragments 411 and 413 to derive authentication codes 417 and 419 respectively. Authentication codes 417 and 419 typically have a fixed length depending on the specific protocol used. In various embodiments, an authentication code 417 is derived by performing hash operations on portions of data fragment 411 sequentially. In one example, information from the Record Header 421 along with positional information (e.g., a sequence number) and the entire data fragment 411 are hashed to derive a sixteen or twenty byte authentication value in authentication code 417. In another examples, a non-fixed number of bytes and other information are used to derive the authentication code.

Portions of the authentication code are referred to herein as authentication values. After the authentication code 417 corresponding to fragment 411 is determined, padding and other information can be added to the data fragment. Both the data fragment and the authentication code are then encrypted to derive the encrypted data and authentication code 427. Algorithms such as DES, AES, and RC4 are used to encrypt the data and the authentication code 427. In many implementations, the data, the authentication code, and padding are all encrypted. This is the case with SSL, for example.

A record header 421 is then attached to the encrypted data and authentication code 427 to create a record. An entity including a header, encrypted data, an authentication code, and padding is referred to herein as a record. According to various embodiments, the encrypted data and authentication code along with the padding has a length equal to a multiple number of fixed sized blocks. A record header 421 contains information such as the length of the record 431, the type of the content, and information about the protocol such as the version of the protocol used. The length typically allows the receiver to know how many bytes to read before processing the record and protocol information allows for the receiver to check to ensure that he supported protocol is being used.

Figure 5:
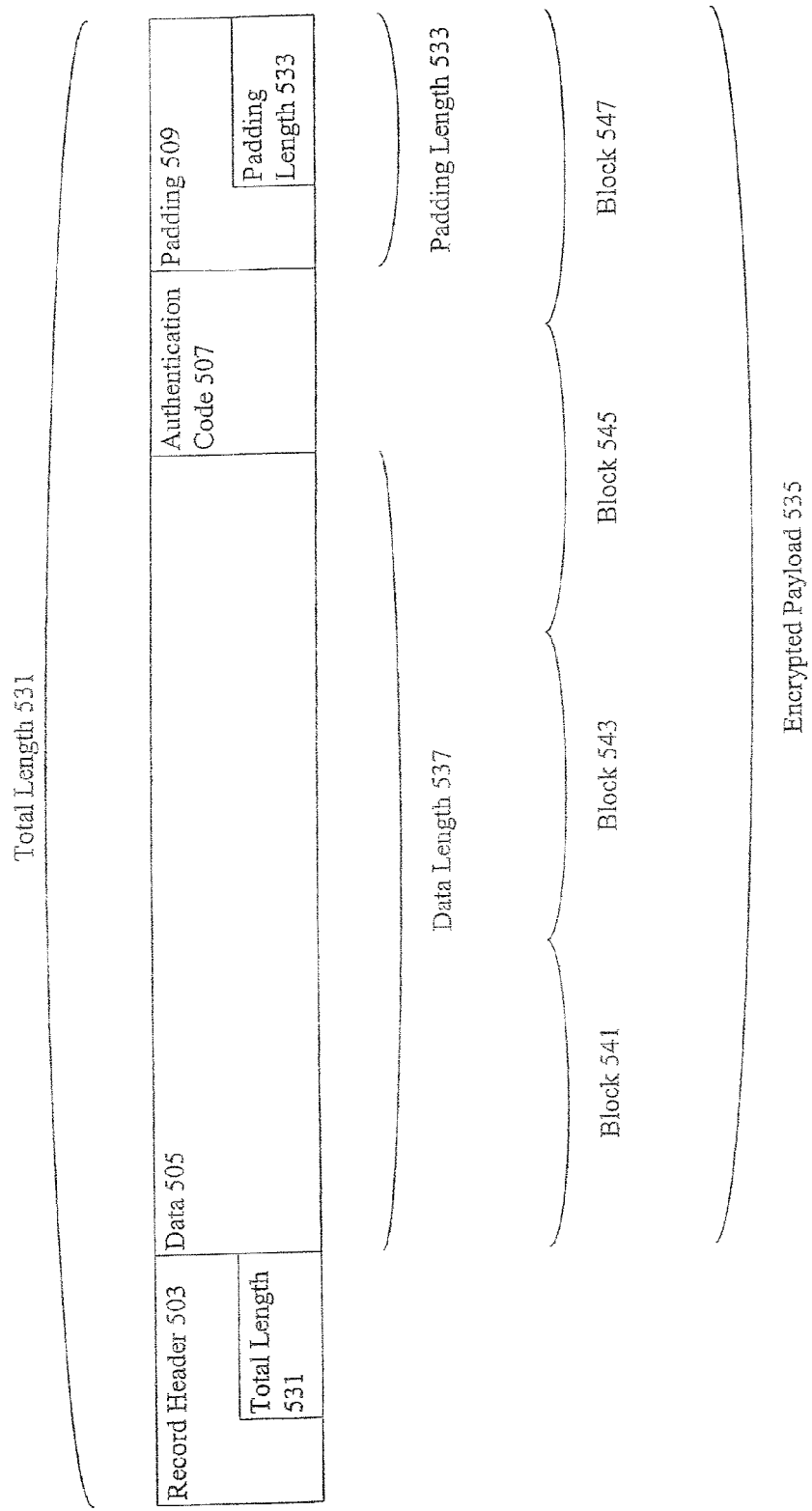
FIG. 5 is a diagrammatic representation showing the structure of a record.

FIG. 5 is a diagrammatic representation detailing one example of a record. The record header 503 includes information on the total record length 531. The record payload 535 includes data of 505, authentication code 507, and padding 509. According to various embodiments, the encrypted payload is equal in length to a multiple number of fixed sized blocks 541, 543, 545, and 547. In order for the record payload length to equal the length of a multiple number of fixed sized blocks, padding 509 is added to the data and authentication code. One reason why the record payload 535 is equal in length to a multiple number of fixed sized blocks is that various block cipher algorithms encrypt and decrypt a fixed amount of data at a particular time. That is, a data block of a particular size is required as an input in block cipher algorithms. Stream cipher algorithms on the other hand do not require any particular fixed sized input.

Context information such as padding length 519 is included to allow a receiver to determine the amount of data to disregard after decryption and to allow a receiver to perform authentication operations. Information used to calculate authentication information is referred to herein as context information. Some examples of context information include a message authentication code secret field, a protocol specific byte code, a sequence number associated with the secured session, a protocol type, a data length, and message data. In one example, a data length 537 is required as an input along with data in order to calculate authentication values corresponding to an authentication code 507. However, the data length 537 can not be determined before the record payload 535 is decrypted. Consequently, typical implementations entail decrypting the entire payload 535 first to determine the padding length 533.

By knowing the total length 531, the padding length 533, and the standard length of an authentication code 507, the data length 537 can be determined. Upon determining the data length 537, authentication operations are performed on data blocks 541 and 543. It should be noted that padding 509 and context information is typically included in the rightmost block 547 of a record. The authentication code 507 is included in either of the rightmost block 547 or in the rightmost block 547 and in the block next to rightmost block 545. The block in a record physically furthest away from the record header 503 is referred to herein as the rightmost block. The block physically closest to the record header 503 is referred to as the leftmost block. As used herein, a first block or a second block can refer to any block in a record.

Block cipher algorithms operate on blocks of data and blocks of encrypted data. In one example, block cipher algorithms operate on a block of ciphertext to output a block of plaintext. Stream ciphers on the other hand, operate on streams of plaintext and ciphertext several bits or bytes at a time. With a block cipher algorithm, the same data will always output the same encrypted data block when a common key is used. With a stream cipher, however the same data bit or byte will encrypt to different encrypted bits or bytes every time the data is encrypted. In order to reduce the certain predictability a block cipher algorithms, mechanisms such as cipher block chaining are used.

Cipher block chaining adds feedback to a block cipher. That is, the information related to the encryption of a first block is fed back into the encryption of a second block. Information related to the decryption of a first block is input into the decryption of a second block. Each encrypted or decrypted block is dependent not just on the data block that generated it but also on all previous data blocks. In cipher block chaining, data is XORed with the previous encrypted block before the data is decrypted.

Figure 6:
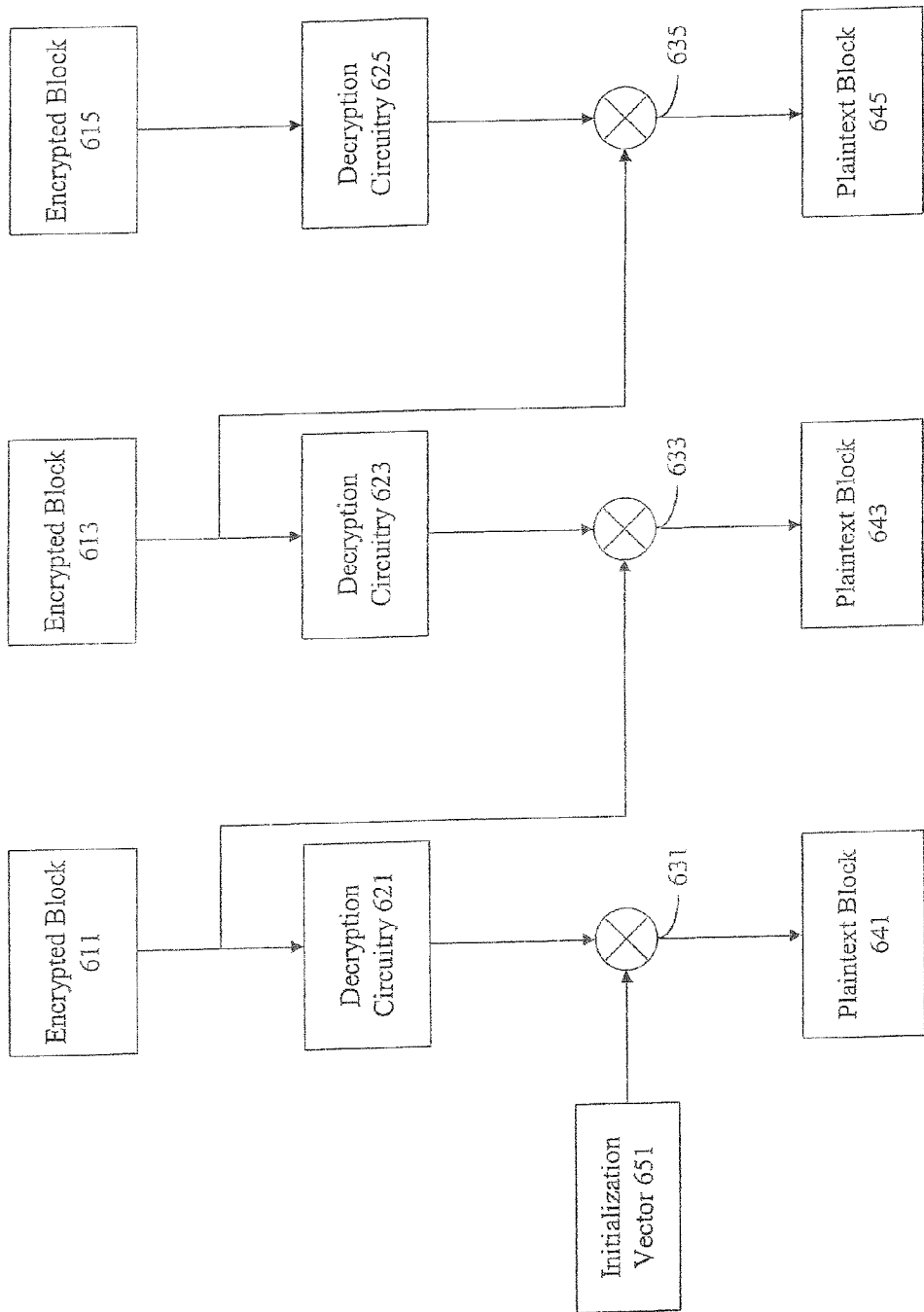
FIG. 6 is a diagrammatic representation showing cipher block chaining used to process blocks in the record.

FIG. 6 is a diagrammatic representation showing one example of cipher block chaining that can be used during decryption of a record. Encrypted block 611 is passed to decryption circuitry 621. The output of decryption circuitry 621 is XORed with an initialization vector 651 to produce a plain text block 641. According to various embodiments, the initialization vector is a sequence of random or pseudo random data shared by an entity encrypting the data and the entity decrypting the data. In one example, a client encrypting the data using cipher block chaining uses a randomly generated initialization vector. The client then sends the initialization vector along with the encrypted data to a receiver. The receiver then decrypts the data using cipher block chaining and the transmitted initialization vector. By using initialization vectors, identical plain text messages encrypt to different cipher text messages.

According to various embodiments, the encrypted block 611 is also passed to XOR component 633. Encrypted block 613 is decrypted using decryption circuitry 623 and combined with the encrypted block 611 at XOR component 633. The results of the XOR combination is plain text block 643. Encrypted block 613 is also passed to XOR component 635. Encrypted block 615 is passed to decryption circuitry 625. The output of decryption circuitry 625 is XORed with encrypted block 613 to produce plain text block 645. In typical implementations, all of the encrypted blocks in a record are decrypted using cipher block chaining. After all of the encrypted blocks are decrypted, authentication operations are then performed on each decrypted block. However, decrypting using cipher block chaining and then subsequently performing authentication operations require that plain text blocks 641, 643, and 645 be stored temporarily and handled again later when context information in the rightmost block is determined.

As noted above, authentication operations can not be performed until context information is extracted from a rightmost block. Consequently, decryption and authentication operations can not be performed simultaneously. This reduces the speed of decryption and authentication and increases the need for extra memory and buffer space to store plain text blocks temporarily. According to various embodiments, the techniques of the present invention contemplate decrypting one or more rightmost blocks in a data stream in order to acquire context information and an authentication code first before other blocks are decrypted. By acquiring context information and authentication values first, the context information and authentication values can be used to perform authentication operations as each plain text block is produced. In one example, context information and an authentication code are included in plain text block 645.

Encrypted block 613 and 615 are used to obtain plain text block 645. Now that the context information and authentication code are obtained, encrypted block 611 can be decrypted and combined with an initialization vector 651 to obtain plain text block 641. As soon as plain text block 641 is obtained, authentication operations can be performed on the plain text block 641 to verify that the block corresponds with the authentication code in plain text block 645. It should be noted that authentication operations can be performed on the plain text block 641 before the other encrypted blocks are decrypted. Anything that occurs before the resulting plain text block is determined is referred to herein as occurring before decrypting the block or before the block is decrypted.

In one example, authentication operations on plain text block 641 are performed before the plain text block 643 is determined. In other examples, several plain text blocks may be acquired before authentication operations are performed on the plain text blocks. Nonetheless, the authentication operations are still performed before other blocks are decrypted. By performing authentication operations immediately upon determining the plain text block, efficiency is enhanced and no added buffer is needed for storing additional plain text blocks.

Figure 7:
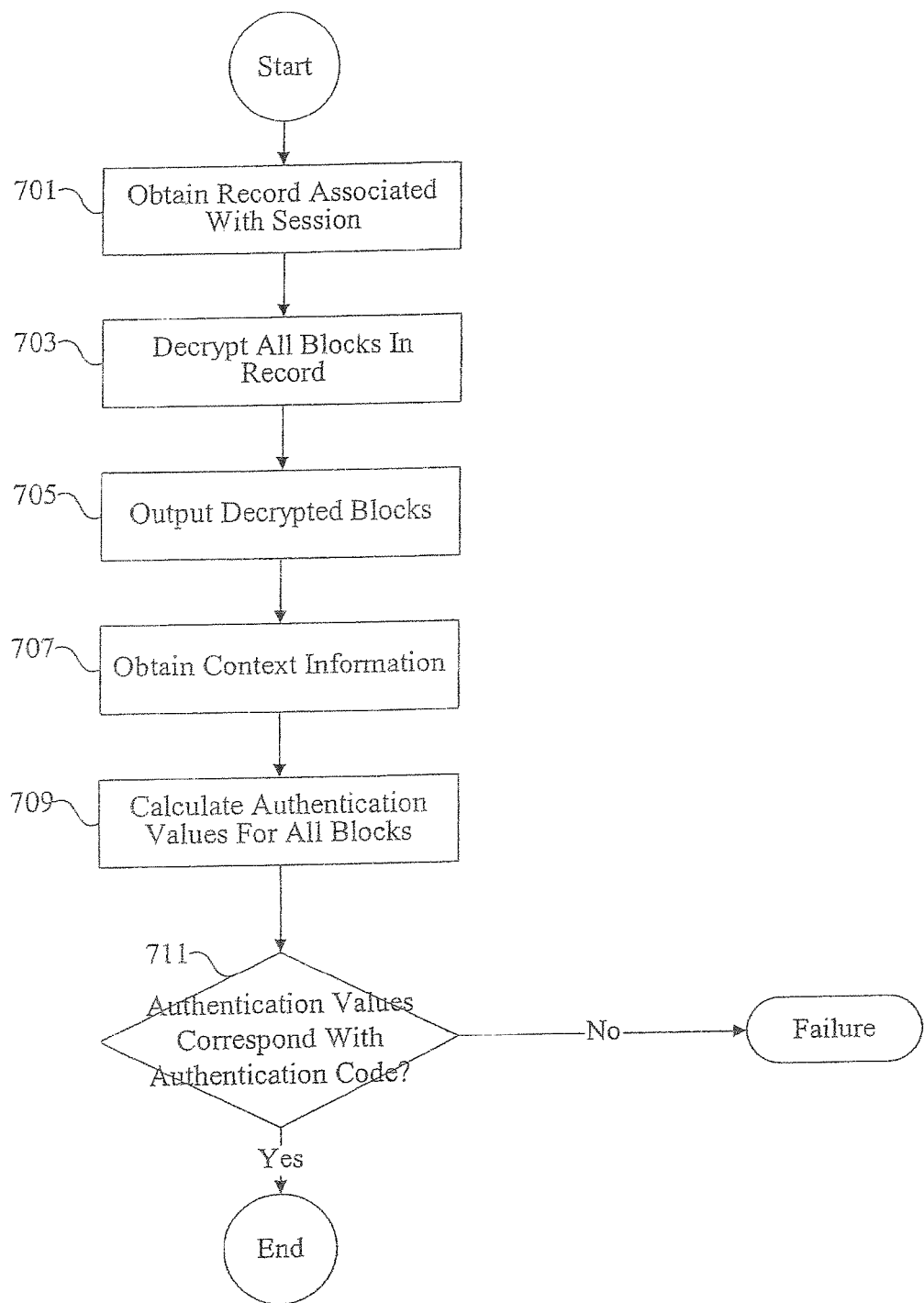
FIG. 7 is a flow process diagram showing a technique for performing authentication and decryption.

FIG. 7 is a flow process diagram showing a typical technique for performing authentication and decryption. At 701, a record associated with a session is obtained. According to various embodiments, the record is any record exchanged during the data exchange phase of a secured session. At 703, all blocks in the record are decrypted. At 705, the decrypted blocks are output. At 707, context information is obtained. In one example, context information is a padding length included in the last byte of the rightmost block in a record. Using the context information, authentication operations are performed on all blocks in the record. If it is determined at 711 that the authentication values determined correspond to the authentication code in the record, the data is output as decrypted and authenticated. However, if the authentication values determined by using the authentication operations do not correspond to the authentication code contained in the record, a failure is noted.

Figure 8:
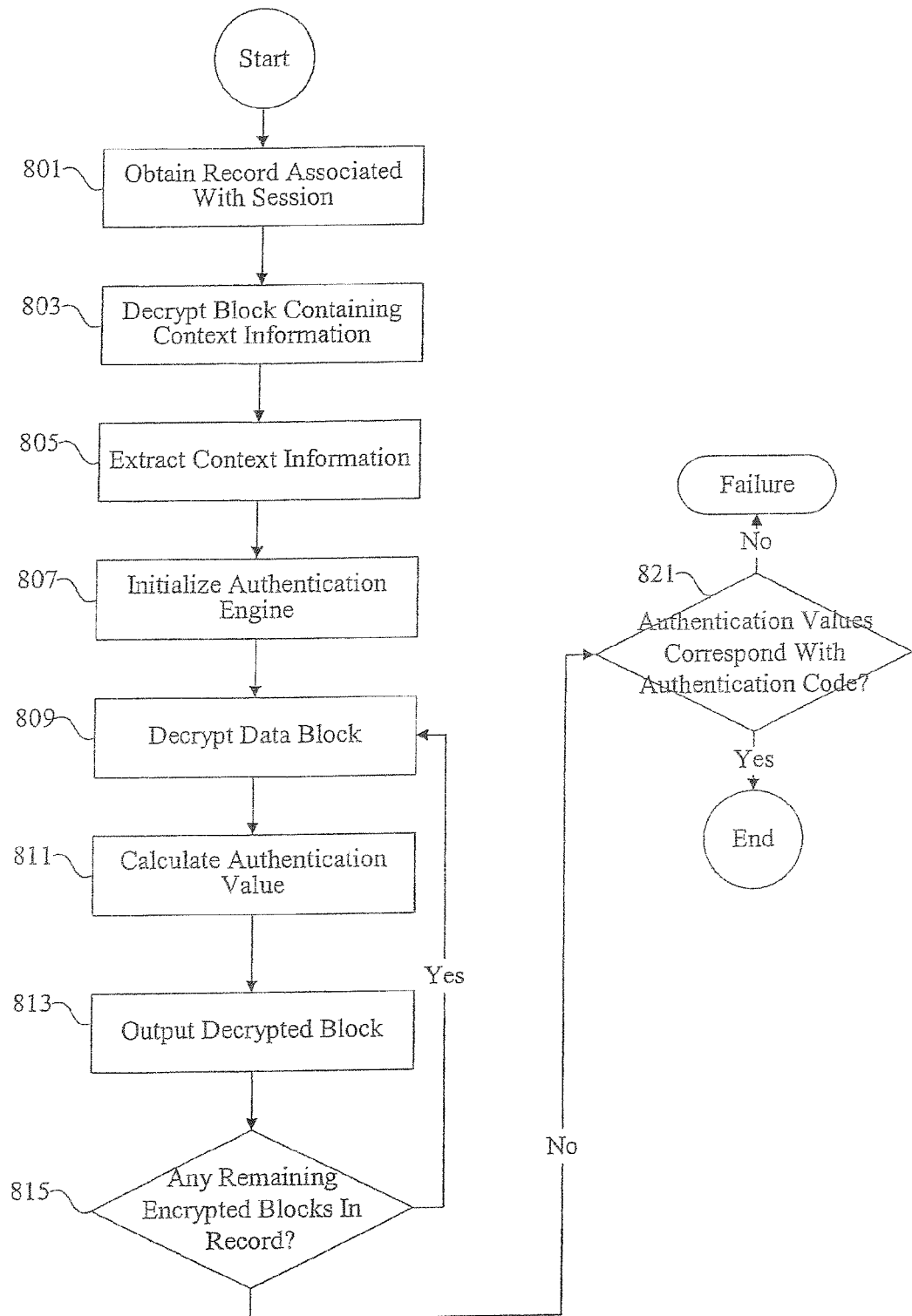
FIG. 8 is a flow process diagram showing another technique for performing authentication and decryption.

FIG. 8 is a flow process diagram showing another technique for performing authentication and decryption. At 801, a record associated with a session is obtained. At 803, a block containing context information such as the padding length is decrypted. In many implementations, the block containing context information is the rightmost block in a record farthest from the header. It should be noted that a header is typically not encrypted. In one example, cipher block chaining entails decrypting the rightmost block by using both the rightmost block and the block prior to the rightmost block in a record.

At 805, context information is extracted and used to initialize an authentication engine at 807. In one example, an authentication engine requires entries such as the length of the actual data in a record in order to perform authentication operations. At 809, a data block such as the leftmost data block is decrypted. Instead of decrypting all the data blocks in a record, the decrypted data block is used to calculate an authentication value. The decrypted block is then output at 813. At 815 it is determined whether there are any remaining encrypted blocks in the record. If there are remaining encrypted blocks, the next data block is decrypted and an authentication value is calculated using the context information. After all of the encrypted data blocks are decrypted and after all authentication values are calculated, it is determined whether the authentication values correspond to an authentication code included in the record. In one embodiment, the authentication code is included in the rightmost block or the block next to the rightmost block in a record.

If the authentication values correspond to the authentication code at 821, the data has been successfully decrypted and authenticated. If the authentication values do not correspond, a failure is indicated. It should be noted that the various steps shown above do not necessarily have to be performed in the particular order specified. In one example, authentication values can be compared with an authentication code as soon as authentication values are calculated at 811. In other examples, several data blocks may be decrypted before authentication values are calculated.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method for performing decryption and authentication using a processor, the method comprising:
    decrypting a first block in a record comprising a plurality of encrypted blocks, the first block including a padding length;
    determining a data length of the record using the padding length;
    decrypting a second block in the record;
    deriving an authentication value, associated with the second block, using the data length; and
    performing an authentication operation on the second block, using the authentication value and the data length, before a third block is decrypted.

2. The method of claim 1, wherein the authentication value comprises a portion of an authentication code associated with the entire record.

3. The method of claim 2, further comprising:
    decrypting each additional block in the record;
    deriving an additional authentication value associated with each additional block; and
    determining whether the authentication code corresponds with the authentication value and the additional authentication values.

4. The method of claim 2, wherein the determining the data length of the record further comprises:
    determining the data length using a total length of the record and the authentication code.

5. The method of claim 3, further comprising determining that an error has occurred if the authentication code does not correspond with the authentication value and the additional authentication values.

6. The method of claim 1, wherein the first block and the second block are decrypted based on predetermined positions in the record of the first block and the second block.

7. The method of claim 1, further comprising simultaneously decrypting and authenticating the second block and each or a plurality of additional blocks in the record, using a plurality of additional authentication values, wherein each additional authentication value is associated with a respective one of the each additional blocks.

8. A method, comprising:
    dividing, using a processing device, a data sequence into a plurality of data fragments;
    storing, using the processing device, context information for a first data fragment in a first block of the first data fragment;
    deriving, using the processing device, an authentication code for the first data fragment, using the context information;
    storing, using the processing device, the authentication code in a second block of the first data fragment, wherein the authentication code comprises a plurality of authentication values, wherein each authentication value is associated with a respective one of a plurality of blocks of the first data fragment, and wherein each authentication value is configured to be used by a receiver to authenticate the respective one of the plurality of blocks before a third block of the first data fragment is decrypted by the receiver; and
    encrypting, using the processing device, the first data fragment and the authentication code.

9. The method of claim 8, further comprising padding the first data fragment and the authentication code to form a record payload having a payload length equal to a length of the plurality of blocks, wherein each block in the plurality of blocks has a fixed length.

10. The method of claim 9, further comprising storing a padding length associated with the padding as context information.

11. The method of claim 8, further comprising attaching a record header to the encrypted first data fragment and authentication code.

12. A method for performing decryption and authentication using a processor, the method comprising:
    decrypting a first block in a record comprising a plurality of encrypted blocks;
    deriving, using context information attached to the record, an authentication value associated with the first block;
    performing an authentication operation on the first block, using the authentication value, before a second block is decrypted; and
    simultaneously decrypting and authenticating the second block and each of a plurality of additional blocks in the record, using a plurality of additional authentication values, wherein each additional authentication value is associated with a respective one of the each additional blocks.

13. The method of claim 12, wherein an authentication code associated with the entire record comprises the authentication value and each additional authentication value.

14. The method of claim 13, further comprising determining that an error has occurred if the authentication code does not correspond with the authentication value and the additional authentication values.

15. The method of claim 13, wherein the context information comprises a padding length.

16. A system, comprising:
    cryptographic circuitry configured to:
        receive a record comprising a plurality of encrypted blocks,
        decrypt a first block in the record, the first block including a padding length,
        determine a data length of the record using the padding length, and
        decrypt a second block in the record; and
    authentication circuitry configured to:
        derive an authentication value, associated with the second block, using the data length, and
        perform an authentication operation on the second block, using the authentication value and the data length, before a third block in the record is decrypted.

17. The system of claim 16, wherein the authentication circuitry is further configured to:
    simultaneously decrypt the second block and each of a plurality of additional blocks in the record; and
    simultaneously authenticate the second block and each of the plurality of additional blocks in the record, using a plurality of additional authentication values, wherein each additional authentication value is associated with a respective one of the additional blocks.

18. The system of claim 17, wherein the authentication circuitry is further configured to:
    determine whether an authentication code associated with the entire record corresponds with the authentication value and the additional authentication values.

19. The method of claim 1, wherein decrypting the second block in the record comprises:
    decrypting the second block in the record using a cipher block chaining decryption algorithm.

20. The method of claim 1, wherein decrypting the second block in the record further comprises:
    decrypting the second block using information obtained during decryption of the first block in the record.

* * * * *

UNITED STATES PATENT AND TRADEMARK OFFICE
CERTIFICATE OF CORRECTION

PATENT NO. : 8,458,461 B2  
APPLICATION NO. : 12/843386  
DATED : June 4, 2013  
INVENTOR(S) : Joseph Tardo Page 1 of 1

It is certified that error appears in the above-identified patent and that said Letters Patent is hereby corrected as shown below:

In the Claims

Column 11, line 37, please replace "or a plurality" with -- of a plurality --.

Signed and Sealed this  
Thirty-first Day of December, 2013

Margaret A. Focarino  
*Commissioner for Patents of the United States Patent and Trademark Office*